United States Patent [19]

Kochis et al.

[11] Patent Number: 5,568,281
[45] Date of Patent: Oct. 22, 1996

[54] AUTOMATIC DOCUMENT PRESENCE, SKEW AND WIDTH DETECTION METHOD AND APPARATUS FOR A DOCUMENT SCANNER

[75] Inventors: Richard L. Kochis; Jacklyn M. Dowdy, both of Fort Collins, Colo.

[73] Assignee: Hewlett-Packard Co., Palo Alto, Calif.

[21] Appl. No.: 509,398

[22] Filed: Jul. 31, 1995

[51] Int. Cl.$^6$ ........................... H04N 1/04
[52] U.S. Cl. ............... 358/475; 358/488; 355/311
[58] Field of Search ................... 358/471, 474, 358/496, 497, 475, 488, 498; 355/309, 308, 311, 230, 228, 229; 382/289, 291; H04N 1/04

[56] References Cited

U.S. PATENT DOCUMENTS

| | | | |
|---|---|---|---|
| 5,225,688 | 7/1993 | Endo | 250/560 |
| 5,313,311 | 5/1994 | Brandkamp | 358/474 |
| 5,506,918 | 4/1996 | Ishitani | 382/289 |

Primary Examiner—Kim Yen Vu
Assistant Examiner—Donald T. Phan
Attorney, Agent, or Firm—Cynthia S. Baan

[57] ABSTRACT

A document scanner method and apparatus is provided which allows for the detection of the presence and size of a document to be scanned. The scanner is also able to determine whether the document being scanned is skewed. The document scanner includes an automatic document feeder (ADF), which includes a light pipe. The light pipe on the ADF redirects light from a light source to extra CCD pixels in a CCD array. Accordingly, when a document is present, the document will come between the light pipe and the light source and the extra CCD pixels in the CCD array will not detect light. When this occurs, a controller will determine that a document is present and will send commands to the ADF to feed the document forward and to the scanner to begin the scanning process. Similarly, other light pipes along the document scan path redirect light to extra CCD pixels of the CCD array and permit document size and document skew to be determined.

6 Claims, 7 Drawing Sheets

AUTOMATIC DOCUMENT PRESENCE, SKEW AND WIDTH DETECTION METHOD AND APPARATUS FOR A DOCUMENT SCANNER

FIELD OF THE INVENTION

This invention relates generally to the field of document scanning, and more specifically to a method and apparatus that is capable of detecting the physical characteristics of a document, such as presence, skew and width of a document being scanned.

BACKGROUND OF THE INVENTION

The technology of document scanning relates to a method and an apparatus whereby the visible image(s) carried by a document is converted to an electronic image signal, for use by a variety of electronic processing means. In accordance with well known techniques, the scanning of a document operates to divide the document into an X-Y matrix comprising a large number of individual picture elements (PEL or PELS) equal in number to X times Y. The scanner apparatus generates an electronic image signal for each document PEL.

The document's visual image is convened into an image signal by the scanning process. This image signal can be used in many ways. For example, the image signal can be transmitted to remote locations for storage or for reproduction by a printer, or the image signal can be manipulated in a manner to enhance or change the image, or the image signal can be merged with other image signals.

When a document is scanned, the entire document must be scanned to make sure that all of the visual image thereon is "read" and "stored" by the scanner. However, if an area larger than the actual document is scanned, the scanning throughput of the scanner is decreased, i.e., scanning time is wasted. Moreover, when an area larger than the actual document is scanned, scanner memory is wasted storing excess information, usually black or white space. One solution to this in the field of copier machines has been to preprogram the copier for three or four of the more common document sizes. However, this solution does not cover all possibilities and has not yet been transferred to facsimile machines or to data entry scanners for computers. Another solution that some manufacturers have developed is a scanner with discrete photoswitches along the width of the document path. This solution is not very advantageous, as it can only be used with an automatic document feed scanner and not with a stationary document scanner, since the document must pass under the vein of the photoswitch and physically trip the switch. Also, the resolution of the system would be restricted to the number of photoswitches. The photoswitches would add significantly to the cost of the scanner and reduce the overall product reliability.

Accordingly, there is a need for a scanner that can detect the exact size of the document to be scanned and only scan the exact area of the document, and thus not waste any scanning time or storage memory by scanning area outside of the actual document being scanned. It would be preferable to accomplish the above goal(s) by adding as few mechanical components to the scanner as possible, in order to keep the overall cost of the scanner down and to keep the mechanical reliability of the scanner high. There is also a need for a system to detect the presence of a document in the scan path and a system to detect whether or not the document in the scan path is crooked (page skew).

SUMMARY OF THE INVENTION

It is an aspect of the present invention to provide a method and apparatus for detecting the presence of a document to be scanned, the actual size of the document to be scanned and to then scan the actual area of the document as detected. Such a system would also determine whether the document being scanned is straight or skewed.

The above and other aspects of the present invention are accomplished in a system that senses the presence of a document using photosensors or the scanner's CCD (Charged Coupled Device) and begins feeding the document into the scanner. As the document is being fed into the scanner by an automatic document feeder the scanner's CCD determine the width and/or the length of the document. The width and/or length that is sensed is then converted into an electronic signal and sent to an ASIC or application software, which then controls the actual area scanned by the scanner. As the document is being scanned, the skew is continually being determined.

Document scanners are conventionally provided with a generally horizontal, flat, glass platen on whose upper surface a document is placed, image side facing down, for scanning. The document can then be scanned by moving a line of light, or a linear footprint or zone of light, relative thereto, or moving the document relative to a stationary light footprint. The present invention will be described with reference to a moving document, stationary light type scanner. However, it is to be understood that the invention is not limited to this particular type of scanner.

The present invention is also described while making reference to a document that comprises a generally opaque substrate (i.e., a sheet of white paper) that contains an image of contrasting, humanly perceptible, image thereon. However, the spirit and scope of the invention is not limited thereto. For example, the present invention finds utility where the document is of any CCD detectable, substantially opaque material. It will be readily appreciated after the below description that various embodiments of the present invention will be appropriate for automatic document feed scanners as well as stationary document, moving light source, document scanners.

DETAILED DESCRIPTION OF THE PRESENT INVENTION

Figure 1:
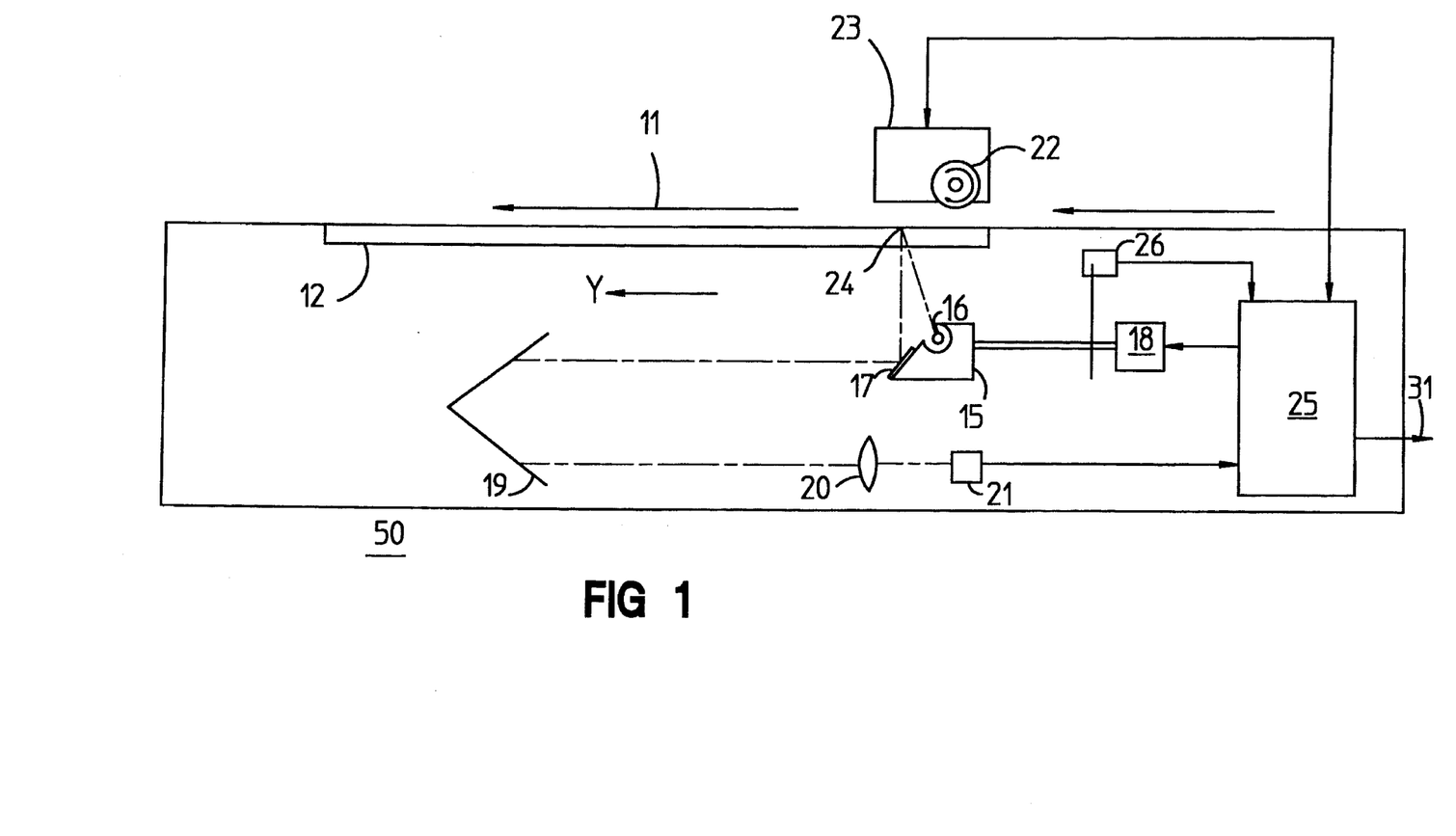
FIG. 1 shows a side cut-away view of a document scanner.

In the description of the present invention, the document scanner may be either an automatic document feed (ADF) scanner, a stationary document scanner with a moving light source, or a combination of both an ADF and a moving light source document scanner. Before the present invention is described, a stationary document scanner and an automatic document feed scanner will be described. FIG. 1 shows a document scanner 50 with document 11 moving across transparent platen 12 with its visual image facing down. Without limitation thereto, document 11 typically comprises a black image on a white background. The document 11 is scanned, so as to convert the black visual image contained thereon into an electronic signal image that is useable by data processing machines, hard copy production, and the like.

For the stationary document scanner with a moving light source system, the scanning process, the details of which are not critical to the present invention, is accomplished by a moveable carriage 15 that contains a light source (scan bar) 16 and a cooperating reflecting mirror 17. Motor 18 is mechanically coupled to carriage 15, by gears, cables or the like, to move carriage 15 in the Y scan direction, along the length of platen 12. The light from light source 16 is reflected by document 11 and then redirected by moveable corner mirror 19 into lens 20 and from there into sensor array 21. A maximum amount of light is typically reflected from the document's white background areas, whereas a minimum amount of light is reflected from the document's dense black image areas. In an alternate embodiment of the invention (not shown), light source 16, a system of reflecting mirrors, lens 20 and sensor array 21 are all mounted at fixed positions on movable carriage 15.

If scanner 50 is used in the automatic document feed mode, than document 11 is grabbed by roller 22 and moved across platen 12 as it is being scanned by stationary scan bar 16 rather than carriage 15 moving scan bar 16 across platen 12 as described above for the stationary document scanner with a moving light source. The light from light source 16 is reflected by document and then redirected by moveable corner mirror 19 into lens 20 and from there into sensor array 21. The rest of the scan process is similar to that for the stationary document scanner with moving light source as described below.

Sensor array 21 used in the scanner of the present invention is preferably a charge coupled device (CCD), without limitation thereto, that is configured as a linear array of discrete light sensitive cells or light detector cells, each of which defines a document picture element (pixel). A CCD which can distinguish 300 or more Pixels or cells per inch on the document provides good quality resolution and is readily available from contemporary commercial sources. Light source (scan bar) 16 is constructed and arranged, in a manner well known to those skilled in the art, to produce a line of light, linear zone of light, or light footprint 24 on platen 12. Light footprint 24 extends in the X direction relative to document 11 (i.e. into the page of FIG. 1), perpendicular to the above defined Y scan direction. Each incremental position of light footprint 24 defines a row of document pixels. As footprint 24 moves across the document (i.e. as the document is scanned), the document is broken down into a number of parallel rows that extend in the X direction, each row being a large number of document pixels in length. An electrical signal of sensor array 21, which represents the document image, is periodically read out, document row by document row, as carriage 15 moves in the Y direction relative to document 11 on platen 12 (or as the document moves in the Y direction relative to the light source). Controller 25 receives position information from position detector 26, provides drive control signals to motor 18 (which can also be accomplished with a stepping motor) and also outputs electrical image signal 31. Alternatively for a scanner with an ADF, controller 25 receives information from document feeder 22, provides drive control signals to the ADF, and also outputs electrical image signal 31.

Figure 2:
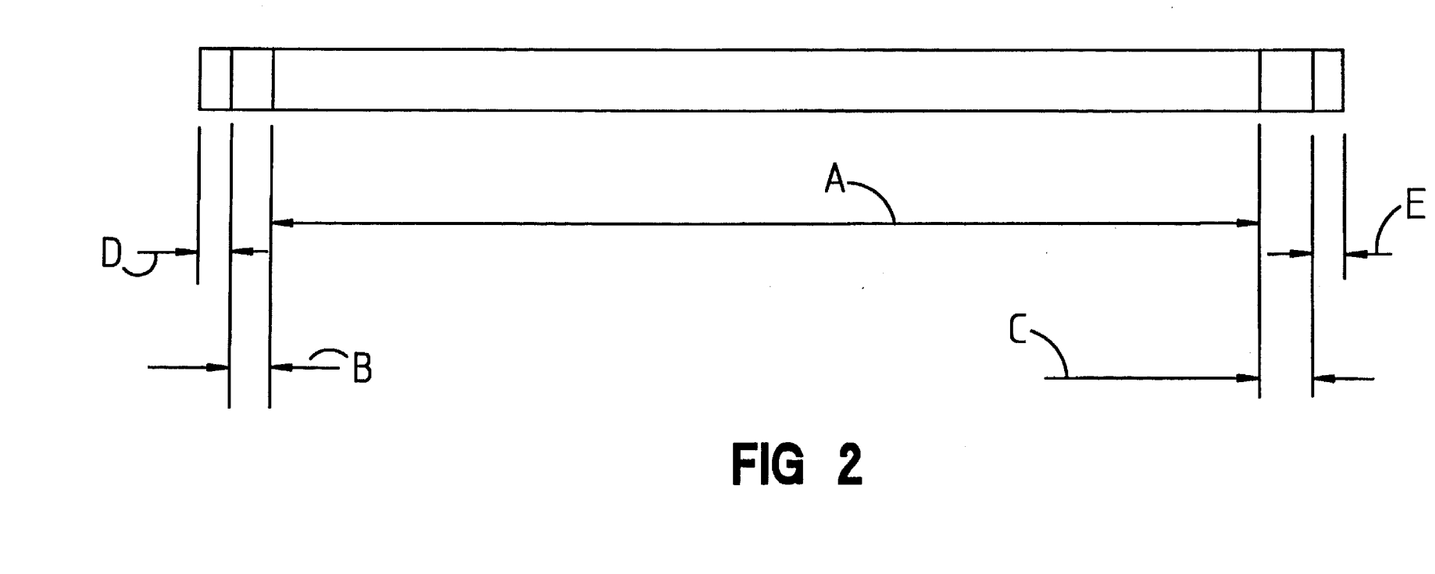
FIG. 2 shows a perspective view of a typical CCD pixel array for a document scanner.
Figure 3:
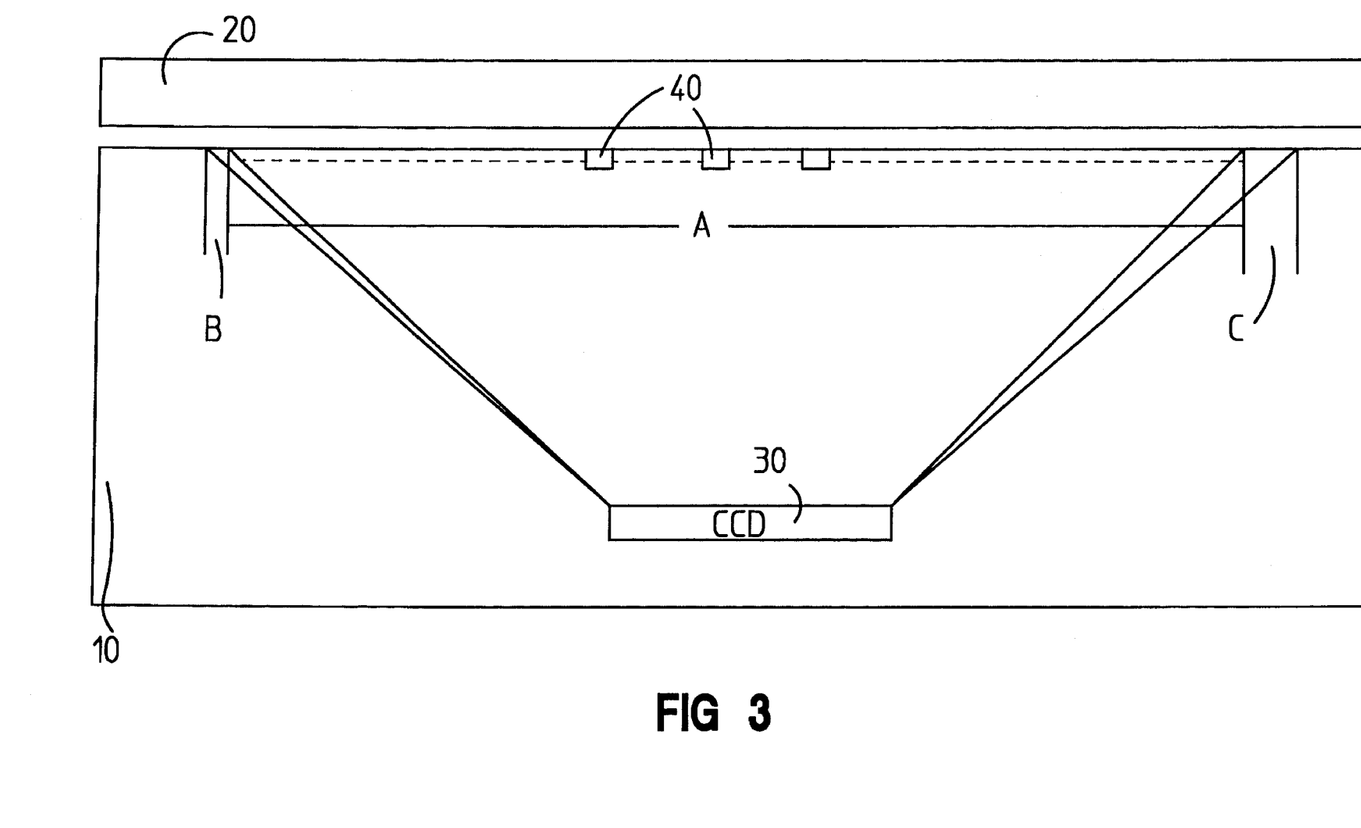
FIG. 3 shows a simplified schematic of a document scanner with a CCD array and a document feeder.

FIG. 2 shows a perspective view of a row of CCD pixels for a typical scanner. FIG. 3 shows a simplified perspective view of a scanner with the CCD array of FIG. 2. Typically, a scanner's CCD array has more pixels than are used for scanning purposes. In particular, A number of pixels are data pixels, B number of pixels are white pixels to the left of data pixels A, C number of pixels are white pixels to the right of data pixels A, and D number of pixels are black pixels to the left of white pixels B. For example, the Toshiba TCD1250D CCD array has 2776 total pixels, which are comprised of 2550 data pixels A, 50 white pixels B to the left of data pixels A, 50 white pixels C to the right of data pixels A, and 64 black pixels D to the left of white pixels B. The left over pixels are used for tolerance. In the Toshiba TCD1250D, the 100 white pixels B to the left of data pixels A are used for white level adjust. This invention proposes using the CCD extra pixels (those not used as data pixels or white level adjust) as document presence, document size and/or document skew detectors.

Figure 4:
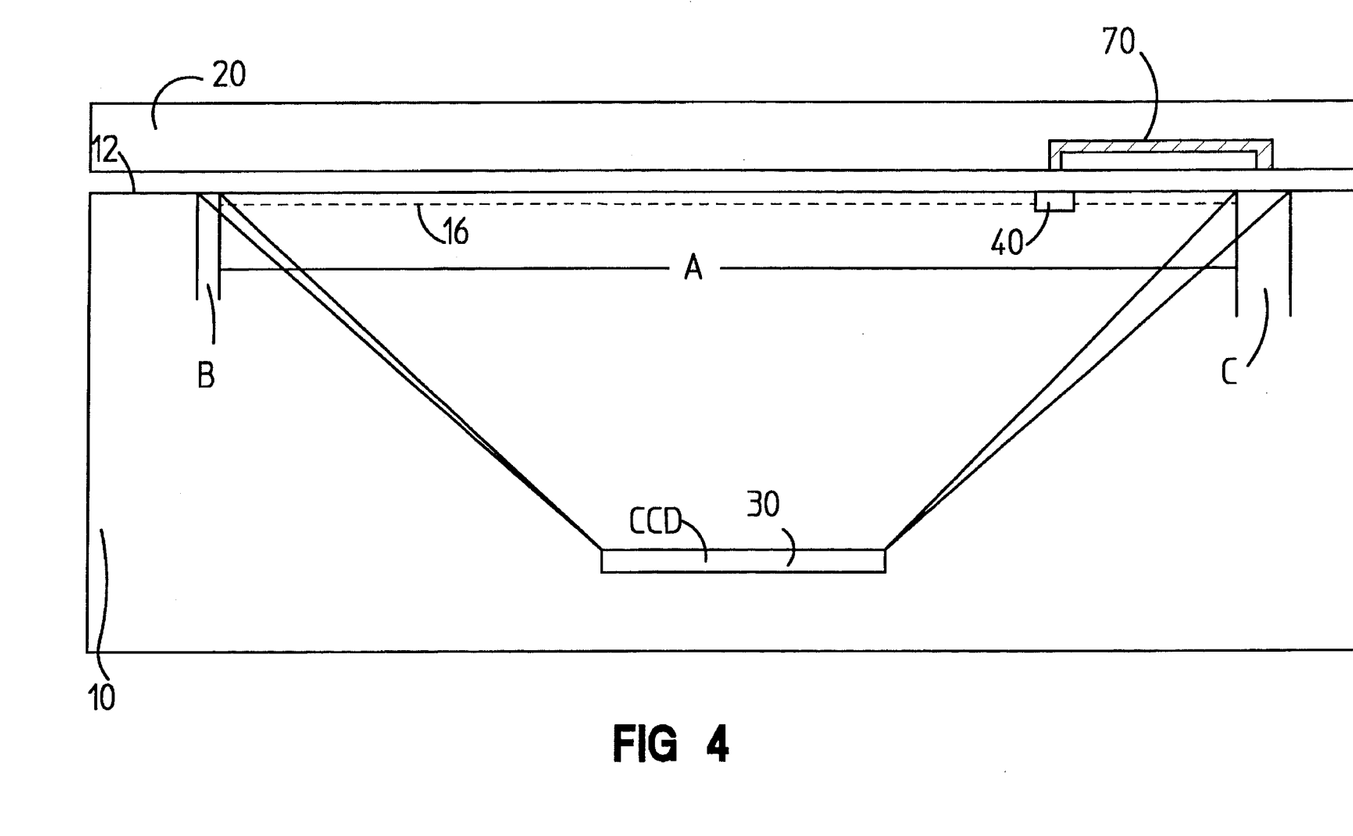
FIG. 4 shows a simplified schematic of a document scanner with a document presence detector system according to a first embodiment of the present invention.

FIG. 4 shows a simplified perspective view of a scanner according to a first embodiment of the present invention. The scanner 10 includes a document feeder 20, a light source means, such as a row of LEDs, and a light detection means 30, such as a CCD array. In FIG. 4, there are data pixels A, white adjust pixels B, and document presence detection pixels C. It is fairly well known in the art to use extra CCD pixels for white level adjust, accordingly, this will not be described in detail. The manner in which the extra CCD pixels C are used for document presence detection is by adding a light pipe 70 to the document feeder 20. The light pipe 70 should extend from a position opposite a section 40 of the row of LEDs to a position opposite the extra CCD pixels C. Thus, if a document is not present, when the LEDs at section 40 are illuminated, light will be detected by the CCD associated with extra CCD pixels C. And, if a document is present, when the LEDs at section 40 are illuminated, the extra CCD pixels C will not detect light. It should be noted that light pipe 70 should extend from a position along the lower edge of the document feeder 20, such that a document of any size will pass under if present.

Accordingly, if documents are typically lined up close enough to the left edge of the scanner, the light pipe should probably extend from a position 40 close to the left edge of the scanner, such that any size will be detected. The light pipe 70 extends from position 40 to the extra pixels C. It should be noted that the light pipe 70 at the extra pixel position C should be beyond the LEDs 16, such that extra pixels C do not detect light directly from the row of LEDs 16, but rather detects light only from light pipe 70. Accordingly, there should be no false document present detects.

The light pipe can be a polished plastic tube, a fiber optic cable, a number of mirrors and optical lenses or any other know means of transmitting the light from position 40 across a length of the document feeder 20 and back to the extra CCD pixels C. As will be understood from a review of FIG. 1, the mirrors and lenses between the LEDs 16, the platen glass 12, and the CCD 30 (21 in FIG. 1) have been removed in FIG. 4 for simplification purposes.

The LEDs at position 40 can readily be made to switch on and off at predetermined intervals or to remain on continually. And the logic connected to the CCD 30 can easily be configured to turn on the extra pixels C at corresponding intervals to detect whether a document is present or not. If a document is detected, then control logic (25 in FIG. 1) starts a motor in document feeder 20, pulls the document across the platen glass 12 and starts the scanning process.

This method of document presence detection is superior to prior methods as it is electrically and mechanically passive, with the only additional component added to the scanner being light pipe 70. Accordingly, there are no additional components that can break down. This method uses LEDs 40 in the row of LEDs 16 already present for the regular scan process, extra CCD pixels C already present on the CCD array 30. A minimum of approximately 10 pixels are needed to accurately determine whether or not a document is present. This should be relatively straight forward since most scanners on the market today have between approximately 40 to 150 extra CCD pixels beyond those necessary for data reproduction. The only additional component being light pipe 70 with slight modifications to the logic 25, most likely implemented in ASIC hardware or software.

The implementation in ASIC hardware or software would be relatively straight forward to one of ordinary skill in the art. By way of example only, one method would be to detect document presence (via the C pixels) by standard binary thresholding, i.e. black (no light) indicates document present, white (light available) indicates no document present. There are numerous other methods to detect presence or absence of a document that will be readily apparent to one of ordinary skill in the art.

Thus, the scanning process of the present invention can be implemented by continually determining whether or not a document is present by a mechanically passive system, rather than having the user push a button to begin the scan process, and rather than having mechanical or light switches along the scan path to determine whether a document is present—all of which methods are more expensive and susceptible to mechanical failure.

Figure 5:
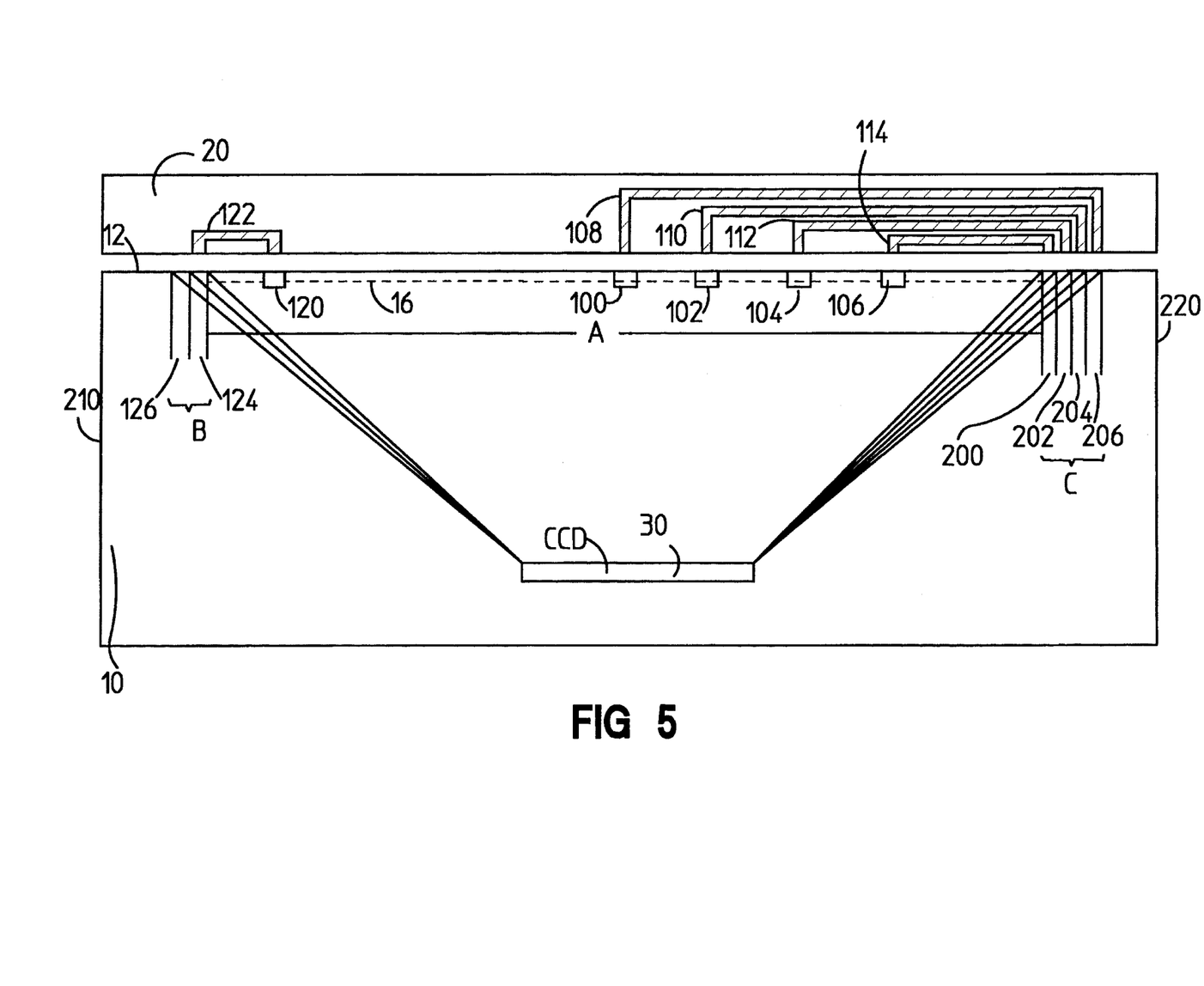
FIG. 5 shows a simplified schematic of a document scanner with a document presence detection system, a document size detection system, and a document skew detection system according to a second embodiment of the present invention.

FIG. 5 shows a simplified perspective view of a scanner according to a second embodiment of the present invention. The scanner 10 includes a document feeder 20, a light source means, such as a row of LEDs 16, and a light detection means 30, such as a CCD array. FIG. 5 shows data pixels A, white adjust pixels 126 and page skew detect pixels 124 of extra CCD pixels B, and document presence detection pixels 200 of extra CCD pixels C. The extra pixels B on the left side of CCD 30 are divided into page skew detect pixels 124 and white adjust pixels 126. As white adjust pixels are well known in the art, this will not be described in detail. For page skew detection, a light pipe 122 is provided on the document feeder 20 with one side opposite LEDs 120 which are spaced a few pixels in from where the left edge of any document would be present. It should be noted that light pipe 122 at extra pixels 124 and light pipes 108, 110, 112, and 114 at extra pixels C should be outside the illuminating area of LEDs 16, such that light can only be detected by the extra pixels at 124 and extra pixels C by the corresponding light pipes and not directly from the row of LEDs. Accordingly, there should be no false detections of document presence, size or skew.

When a document is present and being scanned, the page skew detect CCD pixels 124 will continually scan to determine whether the document is skewed. Thus, if the document is straight during the scan process, CCD pixels 124 will not detect any light from LEDs 120. However, if during the scanning process the document becomes skewed more than a predetermined amount (determined by how far in from the left edge of the document scanning area LEDs 120 and light pipe 122 are arranged), then skew detect CCD pixels 124 will detect light from LEDs 120 and the controller 25 will stop the scanning process and possibly sound an alarm or send an error message to the user.

Another feature of the second embodiment is a combination document presence detection system and document size detection system. The manner in which document presence detection is accomplished is by adding a light pipe 108 to the document feeder 20. The light pipe 108 should extend from a position opposite a section 100 of the row of LEDs 16 to a position opposite a first set 206 of the extra CCD pixels C. Thus, if a document is not present, when the LEDs at section 100 are illuminated, light will be detected by the first set of CCD pixels 206. And, if a document is present, when the LEDs at section 100 are illuminated, the first set of pixels 206 of extra CCD pixels C will not detect light. It should be noted that light pipe 108 should extend from a position along the lower edge of the document feeder 20 that a document of any size will pass under if present. Accordingly, if documents are typically lined up close to edge 210 of the scanner, the light pipe 108 should probably extend from a position 100 close to the left edge of the scanner to the first set 206 of extra CCD pixels C.

The document size detection system is implemented according to the second embodiment of the present invention by means of several light pipes 108, 110, 112, 114, etc. along the lower edge of document feeder 20 opposite LEDs 100, 102, 104, 106, etc. Accordingly, when a document to be scanned is lined up close to edge 210 of scanner 10 and extends to a position past light pipe 110, but the document does not reach the position of light pipe 112, then when LEDs corresponding to positions 102 and 104 are illuminated, light will travel through light pipe 112 to CCD 202 of extra CCD pixels C. Under these conditions, the light from the LEDs at position 102 will be blocked by the document and the light will not travel through light pipe 110 to CCD 204 of extra CCD pixels C. When a predetermined level of light is detected for position 104 and not for position 102, the controller 25 will select a predetermined size of paper.

The position of light pipes 108, 110, 112, 114, etc. can be strategically chosen from predetermined paper sizes, such as light pipe 108 just less than 8½ inches from position 120 and light pipe 110 is just greater than 8½ inches. Accordingly, if the CCD pixels associated with light pipe 108 do not detect light and the CCD pixels associated with light pipe 110 detect light, then the controller 25 will select document size 8½×11. Along these same lines, light pipe 112 can be positioned just less than 11 inches from position 120 and 114 can be positioned just greater than 11 inches from position 120. And more light pipes can be similarly positioned to cover the most often used document sizes.

Obviously, there are numerous arrangements of the light pipes to determine paper size—some more efficient than others. For example, one alternative is to place light pipe 108 just inside the width from position 120 of the smallest standard size document, light pipe 110 just inside the width from position 120 of the next smallest standard size document, light pipe 112 just inside the width from position 120 of the next smallest standard size document, light pipe 114 just inside the width from position 120 of the next smallest standard size document, and so on. Accordingly, if the CCD pixels associated with light pipe 108 do not detect light and the CCD pixels associated with light pipe 110 do detect light, the controller 25 will select the document size to be the smallest standard size document and so on. Alternatively, the light pipes 108, 110, 112, 114, etc. could be spaced just outside the width of the various standard size documents from position 120. If the CCD pixels associated with a particular light pipe 108, 110, 112, 114, etc. does not detect light, the controller selects the size document associated with that light pipe. The logic and/or software modifications necessary to implement the document presence detection, document size detection, and document skew detection of the first and second embodiments is rudimentary.

Figure 6:
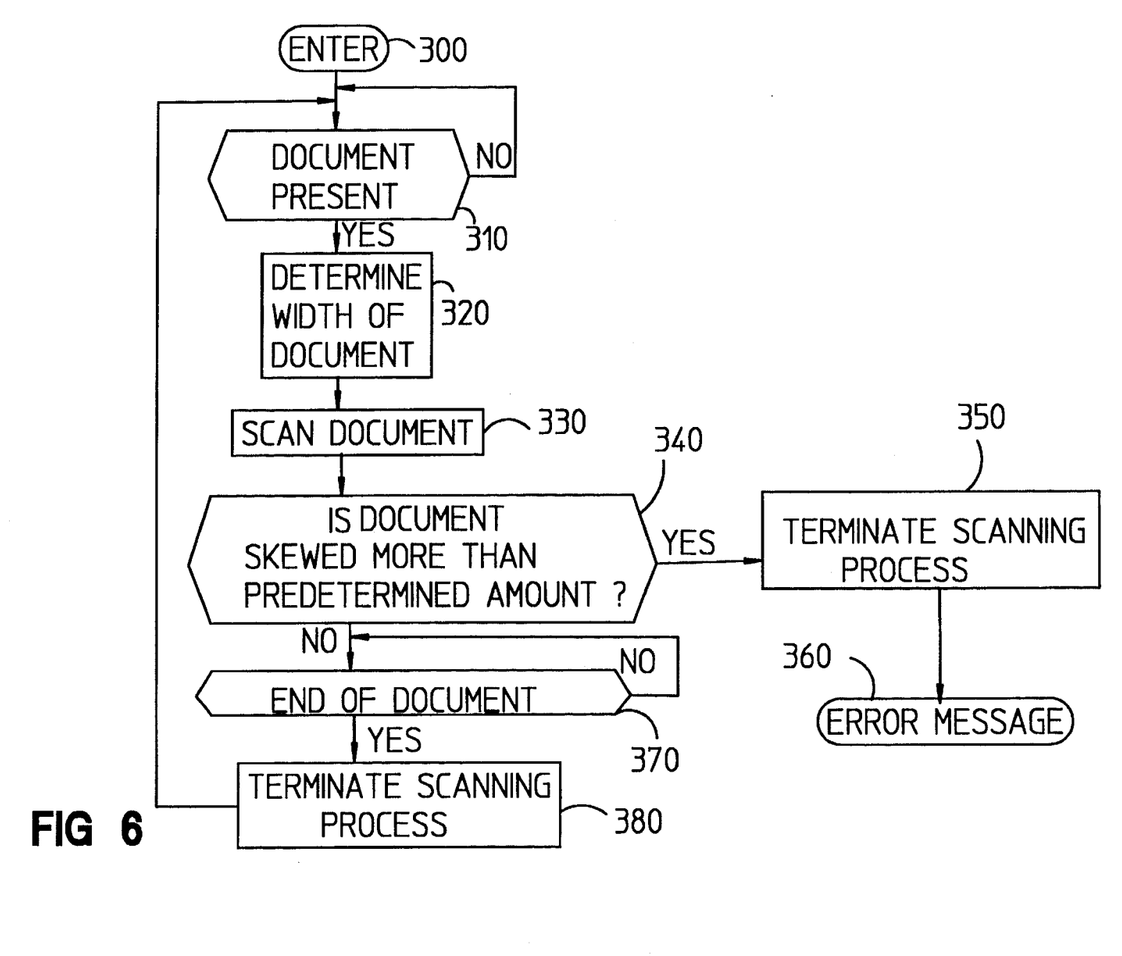
FIG. 6 shows a flow chart of the process for scanning a document by the scanning process according to the second embodiment.

In operation, document presence, document size and document skew are determined by the following procedure, as illustrated in FIG. 6. The scanner senses the presence of a document by having controller 25 continually (or periodically) illuminates LEDs at position 120 and senses with the CCD pixels 124 associated with LED position 120 to determine if a document is present (block 310). When the presence of a document is sensed, controller 25 then illuminates LEDs at positions 100, 102, 104, and 106 and senses with CCD 200, 202, 204, and 206 until a transition from dark to light is detected. Once a signal transition is observed, then the document size can be determined by detecting where the signal goes from dark to light on the edge of the document furthest from position 120 (block 320). The document width data is sent by controller 25 to application software which returns a signal to the controller as to the document size and the pixels that do not need to be scanned, because they are outside the width of the document.

The document is then pulled forward by the automatic document feeder (ADF) and scanned (block 330). While the document is being scanned, the LEDs at position 120 are periodically illuminated and pixels 120 are correspondingly, periodically sensed to determine whether the document is skewed (block 340). As long as the document is being scanned, the controller will continually (or periodically) determine the skew of the document (blocks 370 and 340). If the document is being fed with a skew greater than a predetermined skew the controller 25 will stop the scan process (blocks 340 and 350) and send an error message to the user (block 360). When the document has finished being scanned, the scanner will terminate the scanning process and wait for a document to be sensed (blocks 370, 380, and 310). If the document is not the last document in the document tray, the process continues after sensing the presence of the next document in the document tray (block 310).

A flow chart for the first embodiment is not given due to the simplicity of the first embodiment. However, it will be readily apparent that such a flow chart would include blocks 300, 310, 330, 370, and 380.

Figure 7:
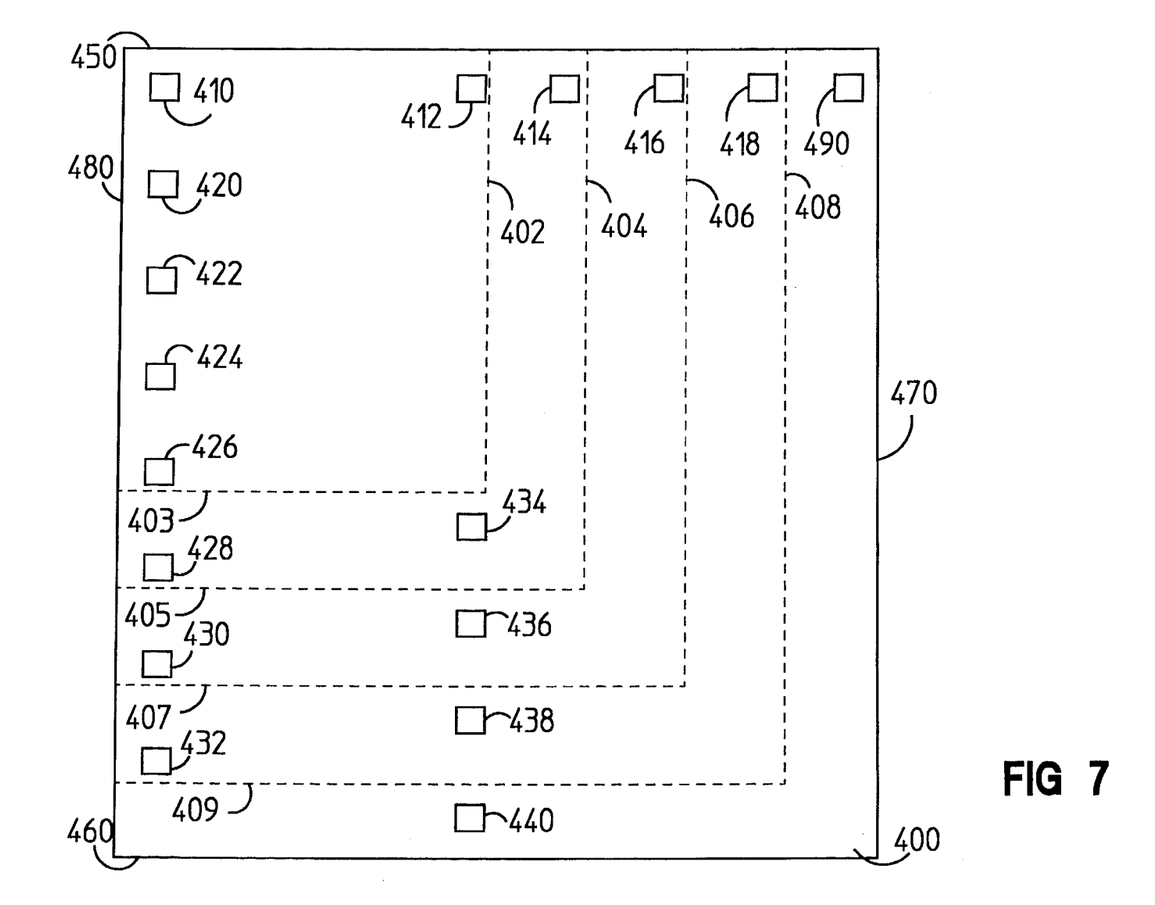
FIG. 7 shows a top view of a scan area of a moving light source scanner with various light pipes for determining document presence, document skew and document size detection according to a third embodiment of the present invention.

A third embodiment is illustrated in FIG. 7, which shows a top view of scan area 400 with light pipes 402, 404, . . . 438, and 440. The scanner of the third embodiment is a moving light source scanner. Light pipe 410 is used in combination with light pipe 490 to determine page presence. If no light is detected by the CCD pixels associated with light pipe 410, but light is detected by the CCD pixels associated with light pipe 490, then the scanner cover is closed and a document is present in the scan area 400. Once a document is determined to be present, then light pipes 412, 414, 416, and 418 are used to determine the width of the document to be scanned. If light is not detected by the CCD pixels associated with light pipe 421, but are detected by the CCD pixels associated with light pipe 414, then page width 402 is selected, and so on. After the width of the page to be scanned has been determined, scanning begins with only the necessary LEDS being utilized.

As the scanning process proceeds, the scan bar (not shown) moves down the document from position 450 towards position 460. As the scan bar passes the position 434, if light is detected by the CCD pixels associated with light pipe 434, then the length of the document is known and the scan process can be terminated and the appropriate page size (403, 405, 407, 409, etc.) is selected for the duplication process.

As the scan bar moves across the scan area from position 450 to position 460, light pipes 420, 422, 424, 426, 428, 430, and 432 are used to determine whether the page is skewed. If light is detected by any of the CCD pixels associated with light pipes 420, 422, 424, or 426, but not detected by the CCD pixels associated by light pipe 434, then the document is skewed more than the predetermined allowable skew and the scanning will terminate and an error message will be sent to the user. If light is detected by the CCD pixels associated with light pipe 428 and not detected by the CCD pixels associated with light pipe 436, then the document is skewed, and so on. However, if light is detected by the CCD pixels associated with light pipe 426 and light is also detected by the CCD pixels associated with light pipe 434, then it will be assumed that the end of the document has been reached and the scan process will be terminated without an error message.

It should be noted that the light pipes shown in FIG. 7 would be located in the scanner lid that would be closed over the document scan area. A document could either be automatically fed to the document scan area or placed there by the user. Only the first end of each of the light pipes is depicted. The second end of each of the light pipes would extend to outside of the document scan area either to right edge 470 or left edge 480 of the document scan area, where the light would be redirected toward extra CCD pixels.

The foregoing description of the invention has been presented for purposes of illustration and description. It is not intended to be exhaustive or to limit the invention to the precise embodiment disclosed, and other modifications and variations may be possible in light of the above teachings. For example, the method and apparatus of the present invention would work equally well for a scanner system that uses a moving-light document scanner.

In such a system, element 20 (FIG. 5) would be a scanner cover and not a document feeder. The CCD of position 124 associated with position 120 would continually measure for a transition from detecting light to not detecting light. Once light is not detected, then the CCD 200 associated with a position outside of the largest standardize document would measure the light at position 106. If light is not detected at the CCD associated with position 120 and light is detected at the CCD associated with position 106, then the controller 25 assumes a document is present and continues with the size detection and scanning process. If light is not detected at the CCD associated with position 120 and light is not detected at the CCD associated with position 106, then controller 25 assumes that the scanner cover 20 is open and the controller continues to sense at the CCD associated with position 106 until light is detected.

The embodiment was chosen and described in order to best explain the principles of the invention and its practical application to thereby enable others skilled in the art to best utilize the invention in various embodiments and modifications as are suited to the particular use contemplated. It is intended that the appended claims be construed to include other alternative embodiments of the invention except insofar as limited by the prior art.

What is claimed is:

1. A document scanner including a document scan area and having an automatic document presence detection system, said automatic document presence detection system comprising:

a light source having individual pixels extending across one side of said document scan area, said light source directing a strip of light toward said document scan area;

a light sense means having individual pixels extending across an area corresponding to said light source, said light sense means detecting light emitted from said light source, said light sense means extending outside the strip of light of said light source, such that said light sense means comprises extra pixels relative to said light source;

an automatic document feeder, said automatic document feeder extending across a second side of said document scan area opposing said light source, such that light from said light source directed toward said document scan area passes through said document scan area and toward said automatic document feeder when a document is not present;

a light pipe positioned in said automatic document feeder with a first end at a predetermined position adjacent said document scan area and a second end at a predetermined position outside of said strip of light of said document scan area, said light pipe being so positioned that light directed from said light source toward said document scan area impinges said first end of said light pipe, passes through said light pipe, exits said second end of said light pipe and is directed toward a predetermined number of said extra pixels in said light sense means when a document is not present in said document scan area, and when a document is present in said document scan area light does not pass through said document scan area to said light pipe and said extra pixels in said light sense means; and a controller for turning on individual pixels of said light source that correspond to the position of said first end of said light pipe at predetermined intervals, said controller being responsive to said extra pixels of said light sense means, whereby if light is detected by said extra pixels of said light sense means the controller continues turning on said light source and monitoring said light sense means at predetermined intervals and if light is not detected by said extra pixels of said light sense means the controller instructs said automatic document feeder to begin feeding a document and the controller initiates the scanning process.

2. The document scanner according to claim 1, further comprising a second light pipe positioned in said automatic document feeder with a first end at a predetermined position adjacent said document scan area near an edge of said document scan area and a second end at a predetermined position outside of said strip of light of said document scan area, said second light pipe being so positioned that light directed from said light source toward said document scan area impinges said first end of said second light pipe, passes through said second light pipe, exits said second end of said second light pipe and is directed toward a second set of said extra pixels in said light sense means when a document is skewed in said document scan area, and when a document is not skewed in said document scan area light does not pass through said document scan area to said second light pipe and said second set of extra pixels in said light sense means, thus no light is detected by said second set of extra pixels when said document is not skewed.

3. The document scanner according to claim 2, further comprising a plurality of light pipes positioned in said automatic document feeder each with a first end at a predetermined position adjacent said document scan area and each with a second end at a predetermined position outside of said strip of light of said document scan area, said plurality of light pipes being so positioned that light directed from said light source toward said document scan area impinges one or more of said light pipes depending on the size of the document in the document scan area, the light passes through one or more of said light pipes, exits said second end of said one or more light pipes and is directed toward a third set of said extra pixels in said light sense means, the controller then selects a paper size depending on which of said plurality of light pipes light was able to impinge or not impinge.

4. A document scanner including a document scan area and having an automatic document presence detection system, said automatic document presence detection system comprising:

a moving light source having individual pixels extending across one side of said document scan area, said light source directing a strip of light toward said document scan area;

a light sense means having individual pixels extending across an area corresponding to said light source, said light sense means detecting light emitted from said light source, said light sense means extending outside the strip of light of said light source, such that said light sense means comprises extra pixels relative to said light source;

a scanner lid, said scanner lid extending across a second side of said document scan area opposing said light source, such that light from said light source that is directed toward said document scan area passes through said document scan area and toward said scanner lid when said scanner lid is shut and a document is not present;

a means for determining whether said scanner lid is open or shut, such that said document presence system will only monitor for the presence of a document if said scanner lid is shut;

a light pipe positioned in said scanner lid with a first end at a predetermined position adjacent said document scan area and a second end at a predetermined position outside of said strip of light of said document scan area, said light pipe being so positioned that light directed from said light source toward said document scan area impinges said first end of said light pipe, passes through said light pipe, exits said second end of said light pipe and is directed toward a predetermined number of said extra pixels in said light sense means when a document is not present in said document scan area, and when a document is present in said document scan area light does not pass through said document scan area to said light pipe and said extra pixels in said light sense means; and a controller for turning on individual pixels of said light source that correspond to the position of said first end of said light pipe at predetermined intervals, said controller being responsive to said extra pixels of said light sense means, whereby if light is detected by said extra pixels of said light sense means the controller continues turning on said light source and monitoring said light sense means at predetermined intervals and if light is not detected by said extra pixels of said light sense means the controller initiates the scanning process.

5. The document scanner according to claim 4, further comprising a multitude of light pipes positioned in said scanner lid each of said multitude of light pipes with a first end at a predetermined position adjacent said document scan area near an edge of said document scan area and a second end at a predetermined position outside of said strip of light of said document scan area, said multitude of light pipes being so positioned that light directed from said light source toward said document scan area impinges said first end of one or more of said multitude of light pipes, passes through said one or more of said multitude of light pipes, exits said second end of said one or more of said multitude of light pipes and is directed toward a second set of said extra pixels in said light sense means when a document is skewed in said document scan area, and when a document is not skewed in said document scan area light does not pass through said document scan area to any of said multitude of light pipes and said second set of extra pixels in said light sense means, thus no light is detected by said second set of extra pixels when said document is not skewed.

6. The document scanner according to claim 5, further comprising a plurality of light pipes positioned in said scanner lid each with a first end at a predetermined position adjacent said document scan area and each with a second end at a predetermined position outside of said strip of light of said document scan area, said plurality of light pipes being so positioned that light directed from said light source toward said document scan area impinges one or more of said plurality of light pipes depending on the size of the document in the document scan area, the light passes through one or more of said plurality of light pipes, exits said second end of said one or more of said plurality of light pipes and is directed toward a third set of said extra pixels in said light sense means, the controller then selects a paper size depending on which of said plurality of light pipes light was able to impinge or not impinge.

\* \* \* \* \*